Patented Nov. 26, 1935

2,022,139

UNITED STATES PATENT OFFICE 2,022,139

DISINFECTING AND PRESERVING AGENT

Georg Meder, Münster on Taunus, and Erich Eggert, Frankfort-on-the-Main, Germany, assignors to I. G. Farbenindustrie Aktiengesellschaft, Frankfort-on-the-Main, Germany No Drawing. Application February 1, 1933, Serial No. 654,758. In Germany February 8, 1932

5 Claims. (Cl. 167—39)

This invention relates to disinfecting and preserving agents, more particularly to agents comprising an addition compound of formic acid with a salt thereof.

The use of formic acid as a disinfectant and as an agent for keeping fresh and preserving forage or the like is known. It is also known to disinfect the respiratory organs by breathing in vapors of formic acid.

The general use of formic acid for disinfecting and preserving purposes is, however, associated with drawbacks, because formic acid has a strongly caustic and blistering effect and its vapors are easily combustible, which renders its utilization rather dangerous. These disadvantages are lessened, but not entirely overcome, by using a strongly diluted acid. The large quantities of liquid, however, which are then necessary can be handled only with difficulty, which impedes the use of dilute formic acid on a technical scale.

According to this invention the said drawbacks are obviated by using a disinfecting and preserving agent comprising an addition compound of formic acid with a salt, preferably an alkali metal salt thereof. The agent may contain one or more of the known additional substances, such as indifferent porous and carrier substances, for instance, magnesia, silicic acid gel, kieselguhr, water glass and so on. The said additional substances bring about a better cohesion of the mass. The said addition compounds are solid and exert no caustic action. They can, therefore, be handled and transported without difficulty. The acid sodium formate $HCOONa.HCOOH$ may, for instance be used. This addition compound is at ordinary temperature sufficiently stable so as to cause no injuries, when in contact with the human skin; furthermore it is dry and capable of being strewn. Its manipulation is quite free from danger. In view of its relatively high formic acid vapor pressure it is well suited for charging gases such as air, with formic acid vapors. The acid sodium formate can advantageously be utilized for disinfecting rooms by means of formic acid vapors or for making silos containing, for instance, green fodder thoroughly acid. If desired, this may be done by subsequently dissolving the compound in water.

Other addition compounds containing formic acid and a formate in stoichiometric quantities may also be used, for instance $HCOOK.HCOOH$ or $HCOONH_4.HCOOH$.

The following examples illustrate the invention:

(1) Into a silo as it is used for preserving green fodder, there are introduced green fodder and solid acid sodium formate in such a manner that on each layer of green fodder there is strewn a thin layer of acid formate. The upper layers are pressed, for instance tramped tight, and the silo is closed.

If the fodder introduced is not very moist it is advisable to sprinkle some water on each layer of green fodder in order to obtain a uniform distribution of the preserving agent. From time to time the acid liquid accumulating on the bottom of the silo is again added to the green fodder on the top of the silo, for instance, by means of a hand pump.

(2) The green fodder is introduced into the silo in known manner with the aid of a blower. Into the blower conduit a dilute, for instance 1 per cent. solution of acid sodium formate is introduced and thus finely dispersed in the green fodder. The further treatment is that indicated in Example 1.

We claim:

1. Disinfecting and preserving agents comprising an addition compound of formic acid with an alkali metal salt of formic acid.

2. Disinfecting and preserving agents comprising an addition compound of formic acid with an alkali metal salt of formic acid and an indifferent carrier substance.

3. Disinfecting and preserving agents comprising an addition compound of formic acid with sodium formate.

4. Disinfecting and preserving agents comprising an addition compound of formic acid with potassium formate.

5. Disinfecting and preserving agents comprising an addition compound of formic acid with ammonium formate.

GEORG MEDER.
ERICH EGGERT.